United States Patent [19]

Watts

[11] Patent Number: 4,776,603
[45] Date of Patent: Oct. 11, 1988

[54] TWO WHEEL HAND TRUCK

[76] Inventor: Hampton H. Watts, 416 Greeley, St. Louis, Mo. 63119

[21] Appl. No.: 888,843

[22] Filed: Jul. 24, 1986

[51] Int. Cl.$^4$ ............................................... B62B 1/04
[52] U.S. Cl. ............................ 280/47.27; 280/47.37 R
[58] Field of Search .............. 414/490; 280/654, 655, 280/47.13 R, 47.24, 47.27, 47.28, 47.22, 47.37 R

[56] References Cited

U.S. PATENT DOCUMENTS

| | | | |
|---|---|---|---|
| Re. 28,936 | 8/1976 | Talamantez | 280/5.28 X |
| 363,940 | 5/1887 | Ash | 280/47.28 X |
| 3,642,301 | 2/1972 | Crawford | 280/47.22 X |
| 3,947,054 | 3/1976 | Hall | 280/654 X |
| 4,358,124 | 11/1982 | Geschwender | 280/47.18 |
| 4,504,071 | 3/1985 | Drummond | 280/47.27 X |
| 4,526,399 | 7/1985 | Holtz | 280/47.37 R X |

Primary Examiner—John J. Love
Assistant Examiner—Michael Mar
Attorney, Agent, or Firm—Gilden & Israel

[57] ABSTRACT

A two wheel hand or appliance truck of the type used for moving heavy objects obtains extra lifting leverage through the use of a separate, pivotally-attached handle which is connected to the pre-existing conventional handle forming a part of the frame. The secondary handle is attached securely to the main frame of the truck by means of welded braces near the top of the primary handle, and may be pivoted upwardly into an operating position against the tension of a shock cord assembly. The secondary handle permits additional leverage to be applied to the load to be lifted.

5 Claims, 2 Drawing Sheets

TWO WHEEL HAND TRUCK

BACKGROUND OF THE INVENTION

1. Field of the Invention

The present invention relates to portable hand trucks, and more particularly pertains to a manually operable two wheel hand truck having a secondary handle assembly for achieving increased lifting leverage.

2. Description of the Prior Art

The prior art hand trucks most commonly used for handling furniture, boxes, and the like, generally consist of a two wheeled frame assembly having a bottom load support plate positionable under the load to be lifted. Such prior art hand trucks may then be pivoted backwardly to effect a lifting of the desired load, with the wheels then providing a means for transporting the load to a desired location. Over the years, many innovative devices have been developed which purportedly increase the leverage and lifting capacity of such hand trucks. In this respect, the prior art is replete with various hand truck designs for improving the efficiency thereof.

For example, U.S. Pat. No. 3,642,301, which issued to B. Crawford on Feb. 15, 1972, discloses a hand truck having means for shifting the center of gravity of the associated load. As illustrated, a spring-loaded shiftable axial is incorporated into the hand truck so that the load center of gravity can be adjusted on the hand truck after the load has been positioned thereon. While the Crawford device may function as alleged, apparently this device has never been marketed -- possibly due to the expense of manufacture, as well as the complicated structure thereof.

Similarly, U.S. Pat. No. 4,358,124, which issed to R. Geschwender on Nov. 9, 1982, discloses an improved two wheel utility cart that provides for load shifting to increase the useability thereof. As can be appreciated, both this utility cart, as well as the Crawford cart, rely upon load shifting to obtain increased leverage without any consideration being given to handle modifications.

As evident by the above-described prior art, the general tendency of the industry has been to concentrate on load shifting upon a utility cart to obtain increased efficiency and ease of use, and little or no consideration has been given to handle design. Inasmuch as the handle structure of a utility cart constitutes a major factor in the leverage force applied to a lifted load, it would appear that there exists areas for improvement in handle design which would result in increased cart leverage. In this regard, the present invention is generally directed to an improved handle structure to obtain increased leverage that serves to fulfill a long existing need.

SUMMARY OF THE INVENTION

In view of the foregoing disadvantages inherent in the known types of portable two wheel hand carts now present in the prior art, the present invention provides an improved hand truck structure wherein increased lifting leverage is obtained through an adjustable handle assembly. As such, the general purpose of the present invention, which will be described subsequently in greater detail, is to provide a new and improved two wheel hand truck which has all the advantages of the prior art hand trucks and none of the disadvantages. To attain this, the present invention is directed to an innovative design for a hand or appliance truck of the type used for the moving of heavy objects. In effect, it provides for increased leverage to enable the operator to move heavier loads with greater ease. It will be useful to all persons who currently use such hand trucks, including beverage delivery persons, heavy appliance movers, furniture movers, and all others who might benefit from such a product. In addition to its primary application, the invention has similar applications for grocery carts, garden carts, wheel barrows, and similar wheeled moving devices.

The leveraged two wheel hand truck comprising the present invention essentially consists of a levered handle that supplements the primary handle on a hand truck and moves with the associated load. This separate handle, which may be constructed of tubular steel to conform to the rest of the truck frame, is slightly higher than the primary truck handle and is attached thereto by means of durable braces attached to each side of the truck frame. Near the points of attachment to the truck frame, the levered handle attaches to a chain that in turn connects it to two shock cord cylinder units where the bottom of the truck frame just above the wheels. The truck itself can be a conventional high-quality appliance or hand truck.

A unique feature of the two wheel hand truck forming the present invention is obviously the levered handle. The handle, as mentioned above, is attached securely to the frame of the truck by means of welded braces near the top of the primary handle, with a typical embodiment of the levered handle being approximately one foot long and having a crossbar across the top for gripping. At the bottom, the two ends of the levered handle connect to a heavy duty chain that connects to the aforementioned shock cord cylinders on either side of the truck frame. The shock cord cylinders provide the take up of slack which permits the levered handle to move upwardly or downwardly. These cylinders consists of a pair of frames approximately 6 inches high by two inches wide, with the frames having bars fitted in top and bottom portions thereof in such a way as to be able to ride up and down within the frame. Shock cord is wound tightly around the bars to hold them against each other within the frame. The attachment of the chain to the handle and to the shock cord, and also to the bottom of the truck frame, is accomplished in such a way that by pulling up on the top of the levered handle, the operator increases the tension within the shock cord cylinder until it reaches a point where it begins to help pull the truck into the optimum position for lifting the load. The design is such that the position of the handle will be retained at an optimum point as determined by the tension of the shock cords and by the weight of the load.

In accomplishing this purpose, the leverage two wheel hand truck allows the operator to transfer a greater lift with far less effort. The strain on arm and back muscles is not nearly so great as with conventional methods. The additional leverage generated by this mechanism greatly aids in moving loads upstairs and on inclines in addition to pulling the truck from a vertical to a slanted position.

There has thus been outlined, rather broadly, the more important features of the present invention in order that the detailed description thereof that follows may be better understood and in order that the present contribution to the art may be better appreciated. There are, of course, additional features of the invention that will be described hereinafter and which form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions so far as they do not depart from the spirit and scope of the present invention.

Further, it should be realized that the purpose of the foregoing abstract is to enable the Patent Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved leveraged two wheel hand truck which has all the advantages of the prior art portable hand trucks and none of the disadvantages.

It is another object of the present invention to provide a new and improved leveraged two wheel hand truck which may be easily and efficiently manufactured and marketed.

It is a further object of the present invention to provide a new and improved leveraged two wheel hand truck which is of a durable and reliable construction.

Still another object of the present invention is to provide a new and improved leveraged two wheel hand truck which provides for increased lifting leverage on a load associated therewith.

An even further object of the present invention is to provide a new and improved leveraged two wheel hand truck which is susceptible of a low cost to manufacture with regard to both materials and labor, and which accordingly is then susceptible of low prices of sale to the consuming public, thereby making such hand trucks economically available to the buying public.

Still yet another object of the present invention is to provide a new and improved leveraged two wheel hand truck which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideratiton is given to the following detailed description thereof. Such description makes reference to the annexed drawings wherein.

DESCRIPTION OF THE PREFERRED EMBODIMENT

Figure 1:
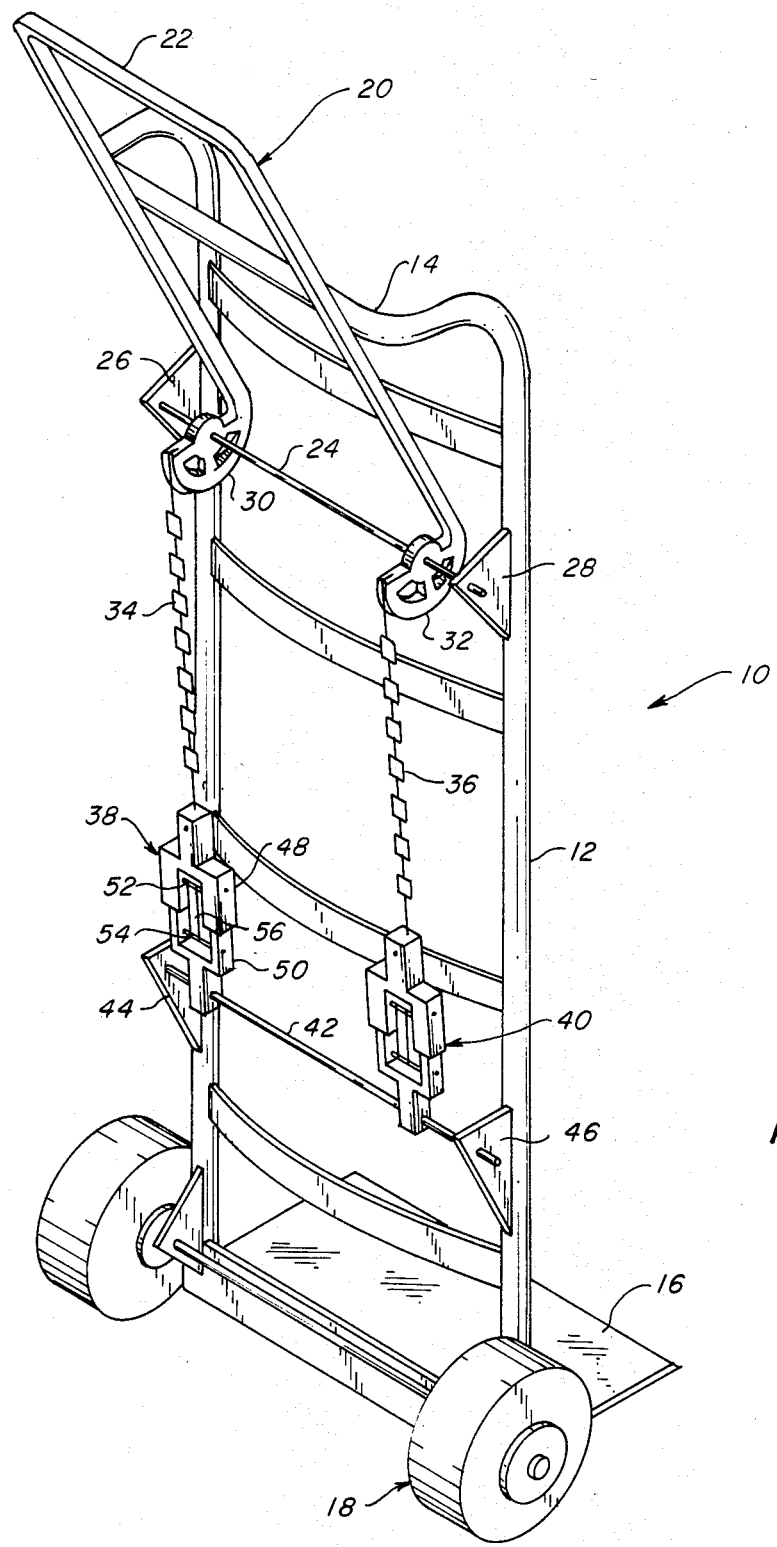
FIG. 1 is a rearwardly-directed perspective view of the leveraged two wheel hand truck forming the present invention.
Figure 2:
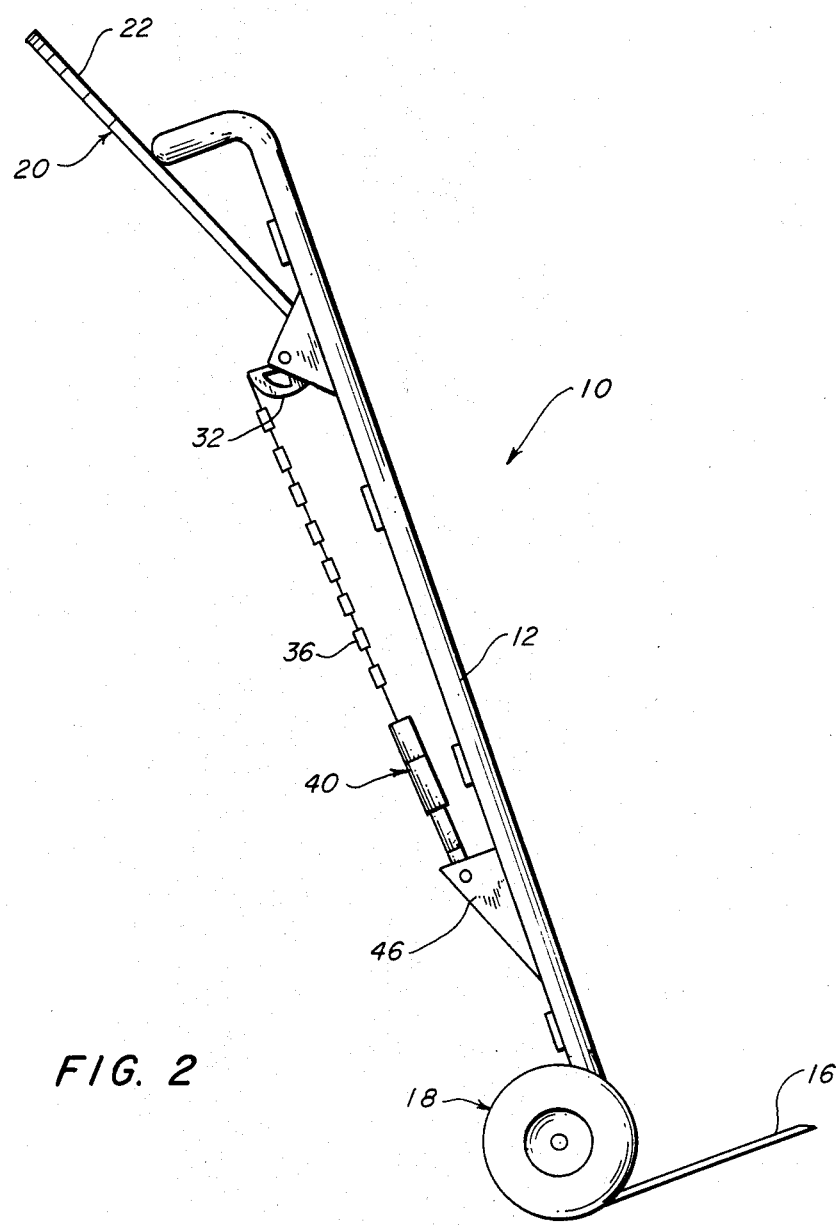
FIG. 2 is a side elevation view thereof.

With reference now to the drawings, and in particular to FIGS. 1 and 2 thereof, a new and improved leveraged two wheel hand truck embodying the principles and concepts of the present invention and generally designated by the reference numeral 10 will be described.

More specifically, it will be noted that the hand truck 10 comprises a conventional frame structure 12 with a topmost portion of the frame having an integral angulated primary handle 14. Attached to a bottommost portion of the frame 12 in a conventional manner is a lifting and load plate 16, while a conventional axle and wheel assembly 18 is also illustrated. As such, the structure thus far described is understood to be of a conventional and currently existing design, and such structure forms no part of the present invention other than to the extent that it is in combination therewith.

Further referencing FIGS. 1 and 2 of the drawings, it will be observed that the present invention comprises a secondary handle assembly 20 operably attachable to the frame structure 12 in a manner yet to be described. More specifically, the secondary handle assembly 20 includes a movable handle 22 pivotally mounted upon a shaft 24. The shaft 24 extends between a pair of braces 26, 28 fixedly secured to the frame structure 12 by some conventional means, such as by welding or the like. The handle 22 includes semi-circular portions 30, 32 on opposed ends thereof, with such circular portions serving as guide means for respective lengths of chain 34, 36.

As illustrated, the length of chain 34 is attached to a first shock cord cylinder assembly 38, while the chain 36 is similarly attached to a second shock cord cylinder cord assembly 40. The shock cord cylinder assemblies 38, 40 are both pivotally attached to a shaft 42 which in turn is interconnected between a pair of braces 44, 46. The braces 44, 46 are similarly connected to the frame structure 12 by welding or some other conventional attaching means.

The structure of the two shock cord cylinder assemblies 38, 40 is identical and as such, only the structure of shock cord cylinder assembly 38 will be described. It is to be understood that the description of the shock cord cylinder assembly 38 applies in all respects to the design and structure of the shock cord cylinder assembly 40. More specifically then, it will be observed that the shock cord cylinder 38 essentially comprises a Y-shaped yoke member 48 slidably mounted over a second Y-shaped yoke member 50 to thus define an adjustable telescoping assembly. Extending between the arm members of the yoke 48 is a rigid bar 52, while a second rigid bar 54 extends between the arms of the yoke member 50. A length of shock cord 56 is wrapped about the two bars 52, 54 in a continuous manner, whereby the shock cord operates as a spring that holds the two yoke members 48, 50 in sliding engagement. Of course, it can be understood that any type of spring-biasing means could be positioned between the yoke members 48, 50 so as to provide the same function and effect of the shock cord 56. As such, it is within the intent and purview of the present invention to include all types of shock cord cylinder assemblies which would function in the manner above described.

With respect to the manner of operation of the present invention, the same should be readily apparent from the above description. However, a brief summary of the operation will be provided. In this regard, it can be seen that a user of the hand truck 10 would normally position a load upon the plate 16, with the hand truck then being rotatable backwardly upon the wheel assembly 18 to effect a lifting of the load. Normally, the handle 14 would be gripped by the operator during a lifting of the load, while the handle 22 could then be gripped to effect a transporting of the load of the cart 10. In this regard, the handle 22 is rotatable about shaft 24 into an upward position as best illustrated in FIG. 1, with the respective chains 34, 36 being guided and received within grooves forming a part of the respective circular handle ends 30, 32. As increased tension is experienced by the chain 34, the yoke 48 will slidingly move away from the yoke 50 which results in increased tension upon the shock cord 56. Once the lifting forces are equal to the tension on the shock cord 56, further relative movement between the yokes 48, 50 will cease, and the handle 22 will be retained at an optimal lifting position. Inasmuch as the handle 22 increases the overall height and length of the frame structure 12, an increased leverage is provided which in return results in easier movement of the associated load.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled the art, it is not desired to limit the invention to the exact construction and operation shown and described, and accordingly, all suitable modifications and equivalents may be resorted to, falling within the scope of the invention.

What is claimed as being new and desired to be protected by letters patent of the United States is as follows:

1. A wheeled hand truck, comprising:
   a. frame means;
   b. lifting plate means attached to said frame means;
   c. wheel means attached to said frame means, said wheel means facilitating a movement of said hand truck;
   d. primary handle means operably attached to said frame means;
   e. secondary handle means pivotally attached to a first shaft, said first shaft being fixedly attached to said frame means, said secondary handle means extending rearwardly of the primary handle during its pivotal arc, said secondary handle means providing increased leverage for lifting and moving a load positioned on said lifting plate means;
   f. shock cord means secured between said secondary handle means and a lower portion of said frame, said shock cord means being attached to said secondary handle means by a flexible member, said shock cord means biasing said secondary handle in a downward direction towards said lower portion of said frame when said hand truck is supporting a load.

2. The wheeled hand truck as described in claim 1, wherein said shock cord means is pivotally attached to a second shaft fixedly secured to said frame means.

3. The wheeled hand truck of claim 2, wherein said shock cord means includes first and second telescoping members, said first telescoping member being attached to said flexible member and said second telescoping member being pivotally attached to said second shaft.

4. The wheeled hand truck of claim 3, wherein a spring-biasing means is positioned between said first and second telescoping members to control relative movement therebetween.

5. The wheeled hand truck of claim 3, wherein a first end of said flexible member is attached to said first telescoping member and a second end of said flexible member is attached to said secondary handle means, said second end of said flexible member being guidingly retained within a groove formed in a semi-circular portion of said secondary handle means.

* * * * *